United States Patent [19]

Geursen et al.

[11] Patent Number: 5,264,251
[45] Date of Patent: Nov. 23, 1993

[54] SUPERABSORBENT-COATED ARAMID YARN AND A PROCESS FOR MANUFACTURING SUCH A YARN

[75] Inventors: Herman J. Geursen, Rozendaal; Stephanus Willemsen, Rheden, both of Netherlands

[73] Assignee: Akzo N.V., Arnhem, Netherlands

[21] Appl. No.: 781,784

[22] Filed: Oct. 23, 1991

[30] Foreign Application Priority Data

Oct. 26, 1990 [NL] Netherlands ............... 9002337

[51] Int. Cl.$^5$ .............................................. B05D 3/02
[52] U.S. Cl. ............................... 427/389.9; 428/395; 174/23 C; 174/107
[58] Field of Search ............... 427/389.9; 428/395; 174/23 C, 107

[56] References Cited

U.S. PATENT DOCUMENTS

| 4,051,065 | 9/1977 | Venema ................... 252/359 A |
| 4,079,027 | 3/1978 | Phillips et al. ........... 260/29.4 UA |
| 4,798,744 | 1/1989 | Goldstein et al. ............ 427/389.9 |
| 4,888,238 | 12/1989 | Katz ................................ 427/389.9 |
| 5,204,175 | 4/1993 | Umeda et al. ................. 427/389.9 |

FOREIGN PATENT DOCUMENTS 0351100  1/1990  European Pat. Off. .

OTHER PUBLICATIONS

Becher, *Emulsions: Theory and Practice*, 1965, pp. 230-255.

Primary Examiner—Shrive Beck
Assistant Examiner—Diana L. Dudash
Attorney, Agent, or Firm—Richard P. Fennelly; Louis A. Morris

[57] ABSTRACT

An aramid yarn, preferably poly(p-phenylene terephthalamide), is coated with a water swellable superabsorbent material. The swelling value of the yarn is at least 60. The superabsorbent provides water blocking capability to the yarn, so that it is suitable for use as a strength member, for example, in water tight optical communication cables. The yarn is made by successively treating an aramid yarn with a water-in-oil emulsion, a superabsorbent material being present in the water phase of the emulsion, and removing the liquid components from the treated yarn by evaporation.

7 Claims, No Drawings

SUPERABSORBENT-COATED ARAMID YARN AND A PROCESS FOR MANUFACTURING SUCH A YARN

BACKGROUND OF THE INVENTION

The invention relates to an aramid yarn provided with a superabsorbent material. The invention further relates to a process for manufacturing such a yarn. This type of yarn can be utilized in cables, more particularly in optical communications cables, in this way functioning simultaneously as a reinforcing member and as a water blocking agent.

An aramid yarn provided with a superabsorbent material and the manufacture of such a yarn are known from European Patent Publication No. 351,100. According to this publication Kevlar® aramid, a commercially available yarn of poly(p-phenylene terephthalamide) from E. I. DuPont de Nemours, was impregnated with a superabsorbent material. After being impregnated, the treated yarn was dried, so that a film was formed in and around the yarn's interstices. In one embodiment of this treatment method, the yarn was impregnated with a superabsorbent material derived from an aqueous solution comprising acrylate polymeric material which combines acrylic acid and sodium acrylate functionalities and water. The resulting product was used as a reinforcing material for the manufacture of a communications cable with water blocking properties.

International Wire & Cable Symposium Proceedings 1988, pp. 307-308, describes a Kevlar® aramid yarn treated with water swellable polymers. Such a yarn was used as a reinforcing material in optical cables, providing them with water blocking properties. This publication discloses neither the composition of the water swellable polymer, nor the manner in which treatment of the yarn with this polymer was carried out.

Also, it is known that cables can be provided with a superabsorbent polymeric material by being contacted with such a material in powdered form, optionally with use being made of electrostatic forces.

There are, however, various drawbacks to each of the above-mentioned methods of applying a superabsorbent material to a cable or yarn surface. A drawback to impregnating an aramid yarn with a superabsorbent material dispersed in an aqueous system is that, due to the superabsorbent material's high viscosity-enhancing action, uniform feeding of it is extremely difficult, if not impossible. Further, on account of the limited concentration of superabsorbent material in the impregnating liquid only a small quantity of it can be applied to the yarn during each treatment. Another drawback to this method is that the comparatively large amount of impregnating liquid which is applied to the yarn with the superabsorbent material needs to be removed by evaporation.

A disadvantage to handling superabsorbent materials in powdered form is that special equipment is required and that, furthermore, it is hard to distribute the powdered material uniformly over the yarn. An additional drawback to handling powders is that dust can be raised, with the attendant risk of explosions and health hazards.

U.S. Pat. No. 4,888,238 discloses a method of preparing superabsorbent synthetic fibers coated with a water absorbent polymer. This patent mentions the use of various synthetic fibers including polyester, polyolefin, polyacrylonitrile, polyamide, rayon, cellulose acetate, Dacron polyester, nylon and bicomponent fibers. The fibers are added to an aqueous solution of an anionic polyelectrolyte, a polyvalent metal salt and a neutralizing agent. They are then fluff dried to evaporate the neutralizing agent and to form a complex of the polyelectrolyte in situ as a coating thereon. Among the drawbacks to this method are that such a method can only be applied to short fibers, the evaporating neutralizing agent, i.e. ammonia, pollutes the atmosphere, and the coating of the superabsorbent is resolubilized at a pH above 7.

DESCRIPTION OF THE INVENTION

The present invention obviates the aforesaid drawbacks. Moreover, the invention provides an aramid yarn of enhanced water-absorbing capacity.

The invention relates to an aramid yarn provided with a superabsorbent material, which yarn is characterized by a swelling value of at least about 60. Preferably, the swelling value of the yarn according to the invention is at least about 80, more particularly at least about 100, and more particularly still at least about 150. The term "yarn" as used herein is to be understood to include all usual fiber types, such as filaments of practically unlimited length and shorter fibers, e.g. staple fibers. Preferably the yarn of this invention comprises filaments of practically unlimited length.

The swelling value is a measure of the quantity of water absorbed by the yarn when it is contacted with water in the liquid form. The method of experimentally determining the swelling value will be illustrated in greater detail below.

It was found that the yarn according to the invention has a substantially higher swelling value than comparable prior art yarns. So far, it has proved impossible to explain this surprising property. It might be that the higher swelling value of the yarn according to the invention is bound up with an improved uniformity of superabsorbent distribution in the yarn. However, the present inventors do not wish to be bound by such a theory which is presented as a possible explanation to the observed phenomenon.

By "aramid yarns", in accordance with the present invention, is meant yarns composed of polymers built up wholly or substantially from recurring units of the general formulae:

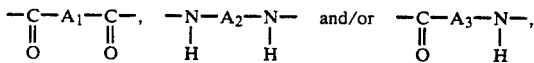

where $A_1$, $A_2$, and $A_3$ represent different or the same divalent, aromatic ring-containing rigid radicals, which may also contain a heterocyclic ring. The chain-extending bonds of such radicals are in a position para- to each other or are parallel and oppositely directed. Examples of such radicals include 1,4-phenylene, 4,4'-biphenylene, 1,5-naphthylene, and 2,6-naphthylene. They may contain substituents, e.g. halogen atoms or alkyl groups, or may be unsubstituted. In addition to amide groups and the aforementioned aromatic radicals, the chain molecules of the aromatic polyamides may optionally contain up to about 35 mole % of other groups, e.g., m-phenylene groups, non-rigid groups such as alkyl groups, ether groups, urea groups or ester groups. Preferably the aramid yarn is made up wholly or in part, more particularly over about 90 wt. %, of poly(p-phenylene terephthalamide).

By a "superabsorbent", according to the invention, is meant a water-soluble or water-insoluble material having hydrophilic properties which is capable of absorbing and retaining a comparatively large quantity of water, optionally under pressure. Thus, the materials to be applied according to the present invention include, in addition to the insoluble superabsorbents mentioned on p. 198 of P. K. Chatterjee, ed.'s Absorbency, Elsevier, Amsterdam (1985) and in European Patent Publication No. 351,100, superabsorbents that are wholly or partially water-soluble.

Although the aramid yarn according to the invention may be provided with any material having superabsorbent properties, preference is given to those superabsorbents which can be processed into stable water-in-oil emulsions. As will be illustrated in greater detail below, there are major advantages to such emulsions in the manufacture of the yarn. Particularly suitable for use are superabsorbent derivatives of polyacrylic acid. These include the homopolymers and copolymers derived from acrylamide, from acrylamide and sodium acrylate, and from acrylamide and dialkylaminoethyl methacrylate. These compounds can be selected from the non-ionic, anionic, and cationic (co)polymers, respectively. They are generally prepared by linking of the monomer units to form a water-soluble polymer which can then be rendered insoluble by means of ionic and/or covalent cross-linking.

Examples of superabsorbents that can be used in the manufacture of the yarns according to the invention include: cross-linked polyacrylic acid partially neutralized into its sodium salt, polypotassium acrylate, copolymers of sodium acrylate and acrylamide, terpolymers of acrylamide and carboxyl group- and sulpho group-containing monomers (sodium salt), and polyacrylamide copolymers. Preferably, use is made of a terpolymer of acrylamide and carboxyl group- and sulpho group-containing monomers (sodium salt) or of a polyacrylamide copolymer.

The invention further relates to a process for manufacturing an aramid yarn provided with a superabsorbent material. This process is characterized in that on the aramid yarn surface there is provided a layer of a water-in-oil emulsion which contains a material having superabsorbent properties in its aqueous phase, and that next the emulsion's liquid ingredients are then wholly or partially removed from the yarn by evaporation. This process renders it possible to produce high quality aramid yarns having superabsorbent properties in an economical manner.

In the process according to the invention, the superabsorbent material is applied to the aramid yarn via a water-in-oil emulsion, the superabsorbent being present in the emulsion's aqueous phase. The preparation of such an emulsion is as follows: using an emulsifier, a water-soluble monomer admixed with a quantity of water is dispersed in a non-polar solvent immiscible with water and the monomer, and is then polymerized to form a water-in-oil emulsion. The polymer formed is in the aqueous phase of the emulsion. In this manner, a liquid product is obtained which contains a highly concentrated superabsorbent while the liquid's viscosity remains low. Such emulsions and their preparation are known to persons of ordinary skill in the art. A description with respect to the water-soluble superabsorbents can be found, for example, in U.S. Pat. Nos. 4,078,133, 4,079,027, 4,075,144, 4,064,318, 4,070,321, 4,051,065, which are each incorporated herein by reference, and in German Auslegeschrift No. 2,154,081, and, with respect to the water-insoluble superabsorbents, in Japanese Patent Publication No. 147630/81.

The continuous oil phase of the emulsion can comprise liquids which are immiscible or poorly miscible with water, such as the linear, branched, and cyclic hydrocarbons, the aromatic hydrocarbons, the chlorinated hydrocarbons, and the like. It is less desired to have liquids with a high boiling point, since it is difficult to remove them from the yarn by evaporation. Preferably, linear, branched, and cyclic hydrocarbons are employed, or petroleum fractions which are substantially made up of a mixture of such hydrocarbons and have a boiling point in the range of about 150°-250° C.

The emulsifiers employed are selected such that the mixture described above can be converted into a water-in-oil emulsion. This means that the emulsifier should have an HLB (hydrophile-lipophile balance) value of 3-12. The meaning of the HLB (hydrophile-lipophile balance) value has been described in P. Becher, *Emulsions, Theory and Practice*, second ed., Reinhold Publishing Corp., New York (1965), pp. 232-255. The concentration of superabsorbent material in the emulsion used according to the invention is about 1-90%, preferably about 2-50%, calculated on the overall weight of the emulsion. Commercially available water-in-oil emulsions containing a superabsorbent generally have a solids content of about 20-70 wt. %. In the process according to the invention, these products can be employed either as such, i.e. undiluted, or in combination with additives, such as lubricants, stabilizers, emulsifiers, and/or diluents.

Examples of materials suitable for use as emulsifier and as lubricant include ethoxylated oleyl alcohol and ethoxylated oleic acid. Examples of materials suitable for use as diluent include non-aromatic naphthenic and (iso)paraffinic hydrocarbons having a boiling point of about 150°-280° C. and isohexadecane, notably hydrogenated tetraisobutylene.

To enhance their stability the dilute water-in-oil emulsions may contain about 5-100 wt. %, preferably about 20-80 wt. %, calculated on the undiluted emulsion, of one or more special stabilizers. These stabilizers should have an HLB value of less than about 5. As suitable stabilizers can be mentioned sorbitan trioleate, mixtures of sorbitan trioleate and ethoxylated sorbitan trioleate, sorbitan mono(iso)stearate, and sorbitan mono-oleate. In general, materials having a higher HLB value will cause the water-in-oil emulsion to have poorer stability. The stabilizers incorporated into the emulsion also have the favorable property of preventing the yarn from becoming electrostatically charged, so that filament spreading and filamentation are avoided. The viscosity of the commercially available water-in-oil emulsions is significantly reduced by their being diluted. As a result, it becomes possible to apply the superabsorbent-containing water-in-oil emulsion to the yarn by means of a kiss roll. In the process according to the invention the water-in-oil emulsion can be applied using methods known to persons of ordinary skill in the art, e.g. via a finishing bath, a kiss roll or a liquid applicator. The amount of superabsorbent on the yarn is selected such that favorable water blocking properties are obtained when the yarn is used in cables. Favorable results are usually obtained if the yarn contains about 0.3-10 wt. %, preferably about 0.5-5 wt. %, and more particularly about 0.6-2 wt. % of the superabsorbent material.

The water-in-oil emulsion having been applied, the yarn is then dried. In this process, the non-polar solvent present in the emulsion and the water are substantially wholly, or for the most part, removed from the yarn by evaporation, so that a uniform layer of the superabsorbent material is left on the yarn surface. Drying takes place according to the conventional methods, in which use may be made of means such as hot drums, hot sheets, hot rollers, hot gases, tube ovens, steam chests, infrared radiators, and the like. The drying temperature is about 50°-300° C., preferably about 100°-250° C.

The process according to the invention can be carried out in several ways. In the fully continuous manner, which is linked directly to the aramid yarn spinning process, the water-in-oil emulsion containing the superabsorbent can be applied to the washed and dried yarn, after which the thus treated yarn is dried. According to another embodiment treatment of the yarn with the superabsorbent present in a water-in-oil emulsion takes places in a separate process not integrated with the spinning process. The process according to the invention, in which the yarn is treated with the superabsorbent material, is particularly suited to be combined, in one and the same process step, with a heat treatment to improve the mechanical properties of the yarn, such as is employed in the production of high-modulus aramid yarns. In Kirk-Othmer, *Encyclopedia of Chemical Technology*, 3rd Ed., Vol. 3 (1978), pp. 213-242 a summary of aromatic polyamide preparation and spinning is provided. A preeminently suitable technique for wet-spinning poly(p-phenylene terephthalamide) is described in U.S. Pat. No. 4,320,081, which is incorporated herein by reference.

The aramid yarns according to the invention can have any linear density and any number of endless filaments as commonly used in practice. Generally, the yarn will have a linear density of about 10 to 20,000 dtex and can be composed of about 10 to 20,000 filaments. The superabsorbent material applied to the aramid yarn according to the invention does not have a negative effect on the yarn's principal mechanical properties. The tenacity of the yarns according to the invention is about 10-35 cN/dtex or higher, preferably about 15-25 cN/dtex. The elongation at rupture is about 0.5-10%, preferably about 1-8%. The initial modulus is about 200-1300 cN/dtex or higher, preferably about 300-900 cN/dtex.

Like the corresponding aramid yarn not treated with a superabsorbent, the yarn according to the invention has a relatively low water content after drying, even after it has been exposed to the air for a longer period of time. After the dried yarn has been conditioned at 20° C. and a relative humidity of about 65% for four weeks, it has a water content not exceeding about 10 wt. %, more particularly not exceeding about 7 wt. %. Apparently, the superabsorbent present in the yarn obtained according to the invention absorbs only a small quantity of the water vapor present in the air. It is only when the yarn is contacted with water in the liquid form that it absorbs a large quantity thereof and so swells.

The procedure to determine the swelling value of the yarn according to the invention is as follows. About 10 g of the yarn to be examined are cut into non-intertwisted fibers of some 12 cm in length. Cutting may, of course, be omitted if the product consists of fibers shorter than about 12 cm. The fiber sample is immersed completely, without stirring, in 600 ml of demineralized water held at 20°-22° C. in an 800 ml beaker. For 60 seconds (measured by stopwatch) the fiber sample remains immersed in the water in a condition of complete rest, i.e. without being stirred, shaken, vibrated, or subjected to some other form of movement. Immediately afterwards, the overall contents of the beaker, i.e. fibers and water, are transferred to a bag (dimensions: about 10 cm × 15 cm) made of polyester curtain netting (mesh size 1.5 mm × 1 mm). In this process, the water for the most part runs out through the mesh of the curtain netting, while the fibers are left in the bag. Next, the bag and its contents are promptly transferred to a centrifuge and then centrifuged for 120 seconds (measured by stopwatch), thus removing the still adhering water from the impregnated fiber sample. The centrifuge used is type SV 4528 (from AEG Aktiengesellschaft, D-8500 Nuremberg), operates at a rate of 2800 revolutions per minute, and has a centrifugal drum with an inner diameter of about 24 cm. Immediately after it has been centrifuged, the fiber sample is transferred from the bag to a weighing box with a pair of tweezers and weighed to an accuracy of 0.0001 g (fiber weight: "a" grams). The fiber sample in the weighing box is thereupon dried to constant weight in an air oven at 105° C. Usually a drying time of 24 hours will suffice. After that, the weight of the dried fiber sample in the weighing box is determined to an accuracy of 0.0001 g (fiber weight: "b" grams). The swelling value of the yarn is calculated by means of the following formula:

$$\text{swelling value} = \frac{(a - b) \cdot 100}{b}.$$

Each determination is carried in duplicate, and the results are averaged.

Because of the properties mentioned hereinbefore the yarn obtained according to the invention is extremely well suited to be used as a reinforcing yarn of high water blocking capacity. Consequently, it is preeminently suitable for use in cables, more particularly optical communications cables.

The invention will be further illustrated with reference to the following Examples.

EXAMPLE 1

At a yarn rate of 20 m/min and using a split applicator and a feed pump (geared pump or tubing pump), an unfinished filament yarn of an aramid composed of poly(p-phenylene terephthalamide) with a linear density of dtex 1680 f 1000 was provided with a water-in-oil (W/O) emulsion. The emulsion contained in its aqueous phase a material having superabsorbent properties. Next, the yarn was dried. The water blocking action of the resulting yarn was determined using the through-flow test. In this test the inner cylindrical space of a section of PVC (polyvinyl chloride) hose open on both sides is filled with a bundle of the yarn, such that the longitudinal axis of the yarn bundle is substantially parallel with the longitudinal axis of the cylindrical space in which the yarn bundle is positioned. The hose filled with the yarn is cut through in a direction perpendicular to its longitudinal axis in two places, such that a cylinder-shaped test tube of a length of 50 mm is formed, and the ends of the yarn bundle present in the thus obtained test tube by and large coincide with the test tube ends. Next, one of the ends of the test tube is contacted with the contents of a vessel of liquid and subjected to the pressure of a head of water of a particular height. The time required to wet the entire yarn bundle in the test tube is referred to as the through-flow time. This time is a measure of the water blocking action of the yarn. The through-flow time is taken to be the time which passes after the application of water pressure to the one end of the test tube and prior to the first drop appearing at the other (free) end.

The through-flow test was carried out under the following conditions:

| Type of hose: | polyvinyl chloride |
|---|---|
| Hose, inner diameter: | 5 mm |
| Hose, outer diameter: | 7 mm |
| Length of test tube: | 50 mm |
| Number of yarns in test tube: | 100 |
| Number of measurements: | 1 |
| Height of liquid head: | 100 cm |
| Testing liquid: | demineralized water |

The number of yarns in the test tube should be chosen such that the bundle formed from them will fully fill the inner cylindrical space of the test tube. For a yarn linear density of dtex 1680 f 1000 this number was found to be 100, giving an overall linear density for the yarn bundle of dtex 168,000 f 100,000.

The composition of the water-in-oil emulsions with which the aramid yarn was treated is listed in Table A. The emulsions were supplied by Chemische Fabrik Stockhausen GmbH, D-4150 Krefeld 1, Federal Republic of Germany:

TABLE A

| Emulsion no. | Trade name | Chemical composition | Solids content (%) | (Viscosity* 25° C.) mm²/s |
|---|---|---|---|---|
| A | A 3024 | poly(potassium)acrylate as W/O emulsion, non-cross-linked | 36 | appr. 250 |
| B | A 3116 | copolymer of (sodium) acrylate and acrylamide as W/O emulsion, non-cross-linked | 30 | appr. 170 |
| C | W 41934 | terpolymer of acrylamide, carboxyl groups- and sulpho groups-containing monomers (sodium salt) as W/O emulsion, cross-linked | 30 | appr. 800 |

*The viscosity was measured with an Ubbelohde viscometer.

The results of the experiments are given in Table B:

TABLE B

| Exp. no. | Emulsion no. | Superabsorbent content of emulsion (wt. %) | Amount of superabsorbent on yarn (wt. %) | Through-flow time (100 cm water head) | Swelling value |
|---|---|---|---|---|---|
| 1 | A1 | 2.1 | 0.5 | appr. 30 min. | 27 |
| 2 | A2 | 4.2 | 1 | >6 days | — |
| 3 | A3 | 12.6 | 3 | >14 days | 79 |
| 4 | A4 | 21.0 | 5 | >6 days | — |
| 5 | A5 | 31.5 | 7.5 | >6 days | — |
| 6 | A | 36 | 0.5 | >5 days | — |
| 7 | B | 30 | 1 | >4 days | 115 |
| 8 | B | 30 | 2 | >6 days | 115 |
| 9 | B | 30 | 0.5 | >5 days | — |
| 10 | C | 30 | 1 | >4 days | 183 |
| 11 | C | 30 | 2 | >6 days | 295 |
| 12 | C | 30 | 0.5 | 18 hrs. | — |

In Experiments 1 through 5 use was made of an emulsion obtained by diluting commercial product A 3024 with a mixture of non-aromatic naphthenic and (iso)-paraffinic hydrocarbons having an atmospheric boiling range of 153° C. to 188° C. (Exxsol D 40 brand, supplied by Exxon Chemical Holland B. V., Schiedam). In the experiments listed in Table B the yarn was successively dried in a tube oven (2 sec., 200°-250° C.) and on a hot sheet (4.5 sec., 130° C.). The through-flow time of the starting yarn, which was not treated with a superabsorbent-containing water-in-oil emulsion, was less than 1 minute.

It is clear from the data in Table B that the process according to the invention permits the manufacture of an aramid yarn which, under the conditions of the through-flow test, is capable of withstanding water at a pressure of 1 m head for more than 14 days. It was found that when emulsions A and B were employed, white deposits were formed on the various yarn guiding members. However, when emulsion C was used, there were no such deposits at all.

EXAMPLE 2

An aramid yarn was treated with a superabsorbent material. The starting yarn and the process used were the same as in Example 1, unless otherwise specified. The composition of the water-in-oil (W/O) emulsions used in the experiments is given in Table C. The viscosity value given in Table C was determined according to the method disclosed for Table A.

TABLE C

| Emulsion no. | Trade name | Chemical composition | Solids content* (%) | Viscosity (25° C.) mm²/s |
|---|---|---|---|---|
| D | Nalco 4755 | polyacrylamide copolymer as W/O emulsion | 50 | appr. 170 |
| E | Nalco 7863 | polyacrylamide copolymer as W/O emulsion | 42 | appr. 290 |
| F | Nalco 7862 | copolymer of sodium acrylate and acrylamide as W/O emulsion | 34 | appr. 270 |

*The solids content was determined as residue after drying at 110° C. for 3 hours. Emulsions D, E, and F were supplied by Nalco Chemical B.V., Tilburg, the Netherlands.

Various materials were added to the emulsions mentioned in Table C to reduce their viscosity, enhance their stability, and/or prevent the formation of deposits on yarn guiding members. In Table D the composition of the resulting W/O emulsions is given in parts by weight:

TABLE D

| | Emulsion no. | | | | | |
|---|---|---|---|---|---|---|
| | A2 | A6 | C1 | D1 | E1 | F1 |
| Content (%) | 4.2 | 11.0 | 8.3 | 9.2 | 8.5 | 7.8 |

TABLE D-continued

|  | Emulsion no. | | | | | |
| --- | --- | --- | --- | --- | --- | --- |
|  | A2 | A6 | C1 | D1 | E1 | F1 |
| A 3024 (36%) | 11.7 | 16.7 | | | | |
| W 41934 (30%) | | | 16.7 | | | |
| Nalco 4755 (50%) | | | | 8.3 | | |
| Nalco 7863 (42%) | | | | | 8.3 | |
| Nalco 7862 (34%) | | | | | | 8.3 |
| Span 85 | | 4.15 | 3.3 | 4.15 | 5.0 | 5.0 |
| Tween 85 | | 0.85 | | 0.85 | | |
| Exxsol D40 | 88.3 | | | | | |
| Exxsol D80 | | 78.3 | | | | |
| Exxsol D120 | | | 80 | | | |
| Isohexadecane | | | | 86.7 | 86.7 | 86.7 |

The compositions listed in Table D are of the following composition: Span 85 is sorbitan trioleate, supplied by: ICI Holland B. V. Tween 85 is ethoxylated sorbitan trioleate, supplied by: ICI Holland B. V. Exxsol D80 and Exxsol D120 are non-aromatic naphthenic and (iso)paraffinic hydrocarbons having an atmospheric boiling range of 196° C. to 237° C., and 255° C. to 294° C., respectively, supplied by: Exxon Chemical Holland B. V., Schiedam. Isohexadecane is a mixture of C16-isoparaffinic hydrocarbons with small amounts of C12-paraffins, supplied by EC Erdölchemie GmbH, Köln, Federal Republic of Germany.

The water-in-oil emulsions listed in Table D were used in the treatment of the aramid yarn disclosed above. The conditions under which the experiments were carried out and the results thereof can be found in Table E:

TABLE E

| Exp. no. | Emulsion no. | Composition concentration (wt. %) | Amount of superabsorbent on yarn (wt. %) | Amount of stabilizer on yarn (wt. %) | Through-flow time (100 cm head) | Swelling value |
| --- | --- | --- | --- | --- | --- | --- |
| 13 | A2 | 4.2 | 1.0 | — | >6 days | — |
| 14 | A6 | 11.0 | 1.2 | 1.0 | >3 days | — |
| 15 | C1 | 8.3 | 1.0 | 0.7 | 4 days | — |
| 16 | D1 | 9.2 | 1.0 | 1.2 | >3 days | 117 |
| 17 | E1 | 8.5 | 0.7 | 1.0 | >7 days | — |
| 18 | F1 | 7.8 | 0.5 | 0.9 | 1 hour | 53 |

For comparison an experiment was carried out in which the aramid yarn was only provided with 0.8 wt. % of conventional Breox 50A50 yarn finishing, i.e. without a superabsorbent-containing water-in-oil emulsion being applied to the yarn. Breox 50A50 yarn finish is composed of ethoxylated and propoxylated butanol and supplied by B. P. Chemicals Benelux, Zwijndrecht, Belgium. The through-flow time for the yarn obtained in this comparative experiment was found to be less than 1 minute.

EXAMPLE 3

In this example, the effect of stabilizers on the stability of the utilized W/O emulsions is demonstrated. Also demonstrated is the effect of four weeks of conditioning at 20° C. and a relative humidity of 65% on the moisture content of the aramid yarn manufactured using the process according to the invention.

An aramid yarn was treated according to the process described in Example 1, except that the linear density of the starting yarn was dtex 1610 f 1000 and the drying of the yarn was with the aid of steam in steam chests (2–3 sec. at 240° C.). In Table F the composition of the W/O emulsions used in the experiments is given in parts by weight:

TABLE F

|  | Emulsion no. | | | | | |
| --- | --- | --- | --- | --- | --- | --- |
|  | C3 | D2 | E2 | C4 | D3 | E3 |
| Content (%) | 25.0 | 30.0 | 24.2 | 15.0 | 18.0 | 15.1 |
| W 41934 (30%) | 50 | | | 50 | | |
| Nalco 4755 (50%) | | 36 | | | 36 | |
| Nalco 7863 (42%) | | | 36 | | | 36 |
| Span 85 | 10 | 12 | 9.1 | | | |
| Exxsol D80 | 40 | 52 | 54.9 | 50 | 64 | 64 |

The stability of the compositions listed in Table F was then determined. By "stability" is meant the time between preparation and the moment when the first deposit becomes visible in the emulsion. The data in question is compiled in Table G:

TABLE G

| Emulsion no. | Concentration of superabsorbent in the composition (wt. %) | Concentration of stabilizer in the composition (wt. %) | Stability in relative units of time |
| --- | --- | --- | --- |
| C3 | 15 | 10 | 3.6 |
| D2 | 18 | 12 | 30 |
| E2 | 15.1 | 9.1 | 30 |
| C4 | 15 | — | 1 |
| D3 | 18 | — | 2 |
| E3 | 15.1 | — | 1 |

Several of the water-in-oil emulsions listed in Table F were employed in the above-mentioned treatment of the aramid yarn. The conditions under which the experiments were carried out and the results thereof are given in Table H:

TABLE H

| Exp. no. | Emulsion no. | Conc. of composition wt. % | Amnt. superabsorb. on yarn wt. % | Amnt. stabilizer on yarn wt. % | Residence time in steam chests sec. | Moist. cont. after winding* wt. % | Moist. cont. after conditioning** wt. % | Through flow time*** days |
| --- | --- | --- | --- | --- | --- | --- | --- | --- |
| 19 | C3 | 25 | 1.5 | 1.0 | 3 | 1.6–2.3 | 3.7 | >17 |
| 20 | D2 | 30 | 1.5 | 1.0 | 3 | 1.4–1.5 | 3.0 | >17 |
| 21 | D2 | 30 | 1.5 | 1.0 | 2 | 2.0–2.1 | 3.1 | >17 |
| 22 | E2 | 24.2 | 1.2 | 0.8 | 3 | 1.5–1.5 | 3.2 | >14 |

*Moisture content after winding measured in duplicate.
**Conditioning for 4 weeks at 20° C. and 65% relative humidity.
***Through-flow time for 100 cm water head.

The swelling value for the yarns obtained in Experiment 21 and 22 was 163 and 107, respectively.

For comparison, experiments were carried out to determine the moisture content and through-flow time of the aramid yarn not treated with a W/O emulsion of a superabsorbent material. After having been conditioned at 20° C. and a relative humidity of 65% such a yarn was found to have an equilibrium moisture content of 3.0% by weight. The yarn through-flow time was less than 1 minute. The swelling value of this untreated yarn was 19.

EXAMPLE 4

This Example demonstrates the favorable effect of stabilizers as regards the yarns manufactured according to the invention being electrostatically charged.

An aramid yarn was treated according to the process described in Example 1, except that the yarn rate was 75 m/min and drying was carried out using a hot sheet (temperature: 140° C., contact time: 2.4 sec.) In Table I the composition of the W/O emulsions is given in parts by weight:

TABLE I

|  | Emulsion no. | | | |
| --- | --- | --- | --- | --- |
|  | D4 | E4 | D5 | E5 |
| Content (%) | 25 | 21.6 | 50 | 42 |
| Nalco 4755 (50%) | 25 | | 100 | |
| Nalco 7863 (42%) | | 21.6 | | 100 |
| Span 85 | 10 | 12.5 | | |
| Tween 85 | 2.5 | | | |
| Exxsol D80 | 62.5 | 65.9 | | |

The composition of emulsion C3 is given in Example 3.

The water-in-oil emulsions listed above were used to treat the aramid yarn. The conditions under which the experiments were carried out and the results thereof are listed in Table J:

TABLE J

| Exp. no. | Emulsion no. | Amount of super-absorb. on yarn (wt. %) | Amount of stabilizer on yarn (wt. %) | Observation during experiment | Yarn tenacity cN/dtex |
| --- | --- | --- | --- | --- | --- |
| 23 | C3 | 1.2 | 0.8 | good bundle cohesion | 18.75 |
| 24 | D4 | 1.0 | 1.0 | good bundle cohesion | 18.56 |
| 25 | D5 | 1.0 | — | charging* | 16.88 |
| 26 | E4 | 0.7 | 1.0 | good bundle cohesion | 18.57 |
| 27 | E5 | 0.7 | — | charging* | 17.46 |

*Electrostatic charging of yarn, filament spreading, filamentation.

Also determined was the yarn tenacity of the starting yarn without superabsorbent. It was 18.80 cN/detx. The experiments show that in the process according to the invention charging of the yarn is inhibited by using a stabilizer. It was also found that there is no filament lapping around rolls. In this way filamentation, which results in reduced yarn tenacity, is avoided.

COMPARATIVE EXAMPLE 5

This comparative Example relates to experiments in which an aramid yarn was treated with a superabsorbent according to the method described in European Patent Publication No. 351,100.

An unfinished yarn of poly(p-phenylene terephthalamide) having a linear density of dtex 1610 f 1000 was impregnated with Aridall 1125 (Fine) Superabsorbent Polymer, supplied by Chemdal Corporation, Arlington Heights, Ill., U.S.A. In this process the yarn to be treated was first passed through a suspension of the superabsorbent in water and then, to promote a more uniform distribution of the superabsorbent over the aramid yarn's surface, through a drawing die of which the passage had a diameter of 0.81 mm. In the experiments the content of superabsorbent in the aqueous suspension was varied. The thus treated yarns were dried in an air oven for 2.5 min at 100° C. The conditions under which the experiments were carried out and the properties of the resulting yarns are given in Table K:

TABLE K

| Exp. no. | Superabsorbent suspension | | Superabsorb. on yarn wt. % | Yarn water content after drying and conditioning wt. %* | Through-flow time (100 cm head) | Swelling value |
| --- | --- | --- | --- | --- | --- | --- |
| | Content wt. % | Viscos. (25° C.) mm²/s | | | | |
| V1 | 0.5 | 700 | 0.66 | 2.7 | 7 min | 38 |
| V2 | 0.7 | 2000 | 0.92 | 2.8 | 15 min | 43 |
| V3 | 1.0 | 5000 | 1.33 | 2.9 | 8–15 hr. | 51 |

*Conditioning for 16 days at 20° C. and a relative humidity of 65%.

The untreated yarn had a swelling value of 21. The results of the through-flow test, as given in Tables B, E, H, and K, demonstrate the enhanced water blocking capacity of the yarns according to the invention. According to Table K the swelling value of the yarns manufactured as described in European Patent Publication No. 351,100 does not exceed 51.

EXAMPLE 6

An aramid yarn was treated according to the process described in Example 1 under the following condition: the linear density of the starting yarn was detx 1610 f 1000; the yarn rate was 150 m/min; and drying of the yarn was with the aid of steam in steam chests (2.4 sec. at 240° C.). In Table L the composition of the W/O emulsions used in the experiments is given in parts by weight:

TABLE L

|  | Emulsion no. | | |
| --- | --- | --- | --- |
|  | G1 | G2 | G3 |
| Content (%) | 26.6 | 33.2 | 33.1 |
| Mirox W 45985 (33.1%)* | 50 | 70 | 100 |
| Span 85 | 10 | 10 | |
| Exxsol D80 | 40 | 20 | |
| Stability** | 84 | 288 | 576 |

*Mirox W 45985 is a terpolymer of acrylamide, carboxyl groups- and sulpho groups-containing monomers (sodium salt) as W/O emulsion in paraffinic hydrocarbons, having a viscosity of 250 mm2/s (measured at 25° C. with an Ubbelohde viscometer). It was supplied by Chemische Fabrik Stockhausen GmbH, D-4150 Krefeld 1, Federal Republic of Germany.
**The stability is expressed in the same relative time units as in Table G The relatively stable water-in-oil emulsions listed in Table L were employed in the above-mentioned treatment of the aramid yarn. The conditions under which the experiments were carried out and the results thereof are given in Table M:

TABLE M

| Amnt. | Amnt. |

TABLE M-continued

| Exp. no. | Emulsion no. | Conc. of composition wt. % | superabsorb. on yarn wt. % | stabilizer on yarn wt. % | Moist. cont. after winding* wt. % | Swelling value | Through flow time** |
|---|---|---|---|---|---|---|---|
| 28 | G1 | 27 | 1.6 | 0.9 | 1.8-1.8 | 84 | >3 days |
| 29 | G2 | 33 | 1.1 | 0.5 | 1.5-1.6 | 63 | about 20 hours |
| 30 | G2 | 33 | 1.4 | 0.6 | 1.7-1.7 | 80 | >3 days |
| 31 | G3 | 33 | 1.5 | — | 1.7-1.7 | 99 | >3 days |

*Moisture content after winding measured in duplicate.
**Through-flow time for 100 cm water head.

The foregoing Examples illustrate certain embodiments and characteristics of the present invention and should not be construed in a limiting sense for that reason. The scope of protection sought is set forth in the claims which follow.

We claim:

1. A process for the manufacture of an aramid yarn provided with a superabsorbent material which comprises providing a layer of a water-in-oil emulsion containing a superabsorbent in its aqueous phase on the aramid yarn surface and removing at least a portion of emulsion's liquid ingredients from the year by evaporation to give an amount of superabsorbent on the yarn of about 0.3 wt % to 10 wt %, based on the weight of the yarn.

2. A process according to claim 1 wherein the aramid yarn which is treated comprises poly(p-phenylene terephthalamide).

3. A process according to claim 1 wherein the water-in-oil emulsion contains from about 2 to about 50 wt. % of the superabsorbent material.

4. A process according to claim 1 wherein the superabsorbent material is a derivative of polyacrylic acid.

5. A process according to claim 1 wherein the water-in-oil emulsion contains from about 20 to about 80 wt. %, calculated on the undiluted emulsion, of a stabilizer having an HLB value of less than about 5.

6. A process as claimed in claim 1 wherein the coated yarn comprises from about 0.5 wt % to about 5 wt % of the superabsorbent material.

7. A process as claimed in claim 1 wherein the yarn comprises filaments of practically unlimited length.

* * * * *